United States Patent
Grover

(10) Patent No.: US 8,124,049 B2
(45) Date of Patent: Feb. 28, 2012

(54) ZERO STEAM EXPORT WITH CO2 RECOVERY IN A HIGH THERMAL EFFICIENCY HYDROGEN PLANT

(75) Inventor: Bhadra S. Grover, Sugar Land, TX (US)

(73) Assignee: Air Liquide Process & Construction, Inc., Houston, TX (US)

( * ) Notice: Subject to any disclaimer, the term of this patent is extended or adjusted under 35 U.S.C. 154(b) by 107 days.

(21) Appl. No.: 12/608,573

(22) Filed: Oct. 29, 2009

(65) Prior Publication Data

US 2010/0104499 A1     Apr. 29, 2010

Related U.S. Application Data

(60) Provisional application No. 61/109,240, filed on Oct. 29, 2008.

(51) Int. Cl.
  *C01B 3/24* (2006.01)
  *C01B 3/38* (2006.01)

(52) U.S. Cl. ........................ 423/650; 252/373

(58) Field of Classification Search .............. 423/650
See application file for complete search history.

(56) References Cited

U.S. PATENT DOCUMENTS

| | | | |
|---|---|---|---|
| 4,553,981 A | 11/1985 | Fuderer | |
| 6,497,856 B1 * | 12/2002 | Lomax et al. | 423/651 |
| RE38,170 E * | 7/2003 | DeGeorge et al. | 518/715 |

* cited by examiner

*Primary Examiner* — Melvin Mayes
*Assistant Examiner* — Kenneth Vaden
(74) *Attorney, Agent, or Firm* — Elwood L. Haynes

(57) ABSTRACT

A high thermal efficiency process for hydrogen recovery is provided. The present invention includes combusting a first fuel stream to a reforming furnace, producing reforming heat and a hot exhaust stream. Then exchanging heat indirectly between the hot exhaust stream and a first feed water stream, producing a first steam stream. Then providing a hydrocarbon containing stream and a feed steam stream to the reforming furnace, utilizing the reforming heat and producing a hot raw syngas stream. Then exchanging heat indirectly between the hot raw syngas stream and second feedwater stream, producing a second steam stream and a cooled, raw syngas stream. Then introducing the cooled, raw syngas stream to a CO shift converter, producing a shifted syngas stream. Then introducing the shifted syngas stream into a pressure swing adsorption unit, producing a hydrogen product stream and a tail gas stream. Then introducing the tail gas stream to a CO2 removal unit, producing a CO2 stream and a recycle stream; compressing the recycle stream, producing a compressed recycle stream. Then combining the compressed recycle stream with at least one stream selected from the group consisting of the hydrocarbon containing stream, the cooled raw syngas stream, the shifted syngas stream, and the tail gas stream. Then combining the first steam stream and the second steam stream, producing the feed steam stream.

13 Claims, 2 Drawing Sheets

US 8,124,049 B2

ZERO STEAM EXPORT WITH CO2 RECOVERY IN A HIGH THERMAL EFFICIENCY HYDROGEN PLANT

BACKGROUND

In a conventional hydrogen plant, shown in FIG. 1, PSA is used for separation of pure H2 from the syngas. The PSA tail gas is used as fuel in the reformer furnace. The heating value of the tail gas should be less than the firing duty of the reformer, otherwise there will be a surplus of tail gas. This requirement presents a constraint in the optimization of the hydrogen plant. The amount of methane slipping the reformer, and the amount of CO slipping the shift reactor has to be below a certain value to meet the constraint. The methane slippage from the reformer is a function of the temperature of the gas exiting the reformer (assuming the pressure and steam to carbon ratio is fixed). The steam is produced by recovering heat from the reformer process effluent as well as the reformer furnace flue gas. If the reformer temperature is increased to reduce methane slippage, the amount of steam made will also increase. The steam used for the process is constant, the export steam quantities increase. This is sometimes not desirable. If a part of the PSA tail gas can be recycled back to the process, the above mentioned constraint is lifted

SUMMARY

The present invention is a high thermal efficiency process for hydrogen recovery. The present invention includes combusting a first fuel stream to a reforming furnace, producing reforming heat and a hot exhaust stream. Then exchanging heat indirectly between the hot exhaust stream and a first feed water stream, producing a first steam stream. Then providing a hydrocarbon containing stream and a feed steam stream to the reforming furnace, utilizing the reforming heat and producing a hot raw syngas stream. Then exchanging heat indirectly between the hot raw syngas stream and second feedwater stream, producing a second steam stream and a cooled, raw syngas stream. Then introducing the cooled, raw syngas stream to a CO shift converter, producing a shifted syngas stream. Then introducing the shifted syngas stream into a pressure swing adsorption unit, producing a hydrogen product stream and a tail gas stream. Then introducing the tail gas stream to a CO2 removal unit, producing a CO2 stream and a recycle stream; compressing the recycle stream, producing a compressed recycle stream. Then combining the compressed recycle stream with at least one stream selected from the group consisting of the hydrocarbon containing stream, the cooled raw syngas stream, the shifted syngas stream, and the tail gas stream. Then combining the first steam stream and the second steam stream, producing the feed steam stream.

DESCRIPTION OF PREFERRED EMBODIMENTS

Figure 1:
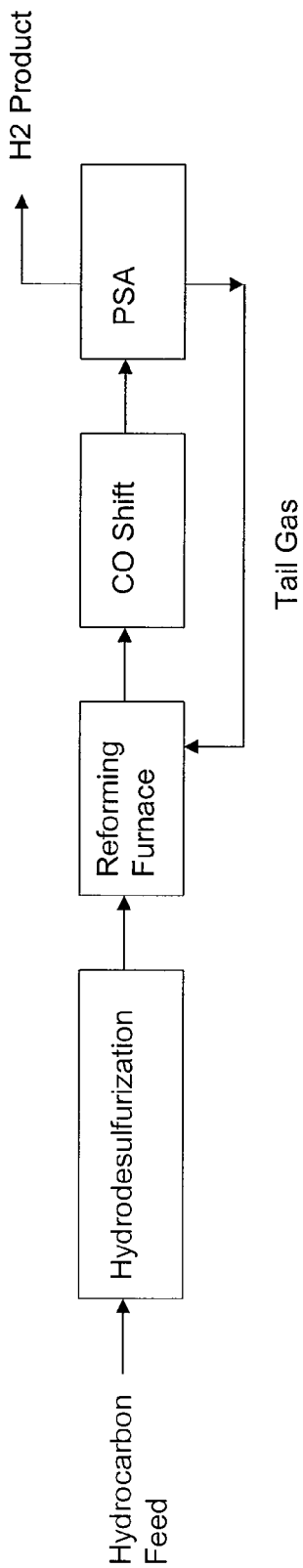
FIG. 1 is a schematic representation of one embodiment known to the art.
Figure 2:
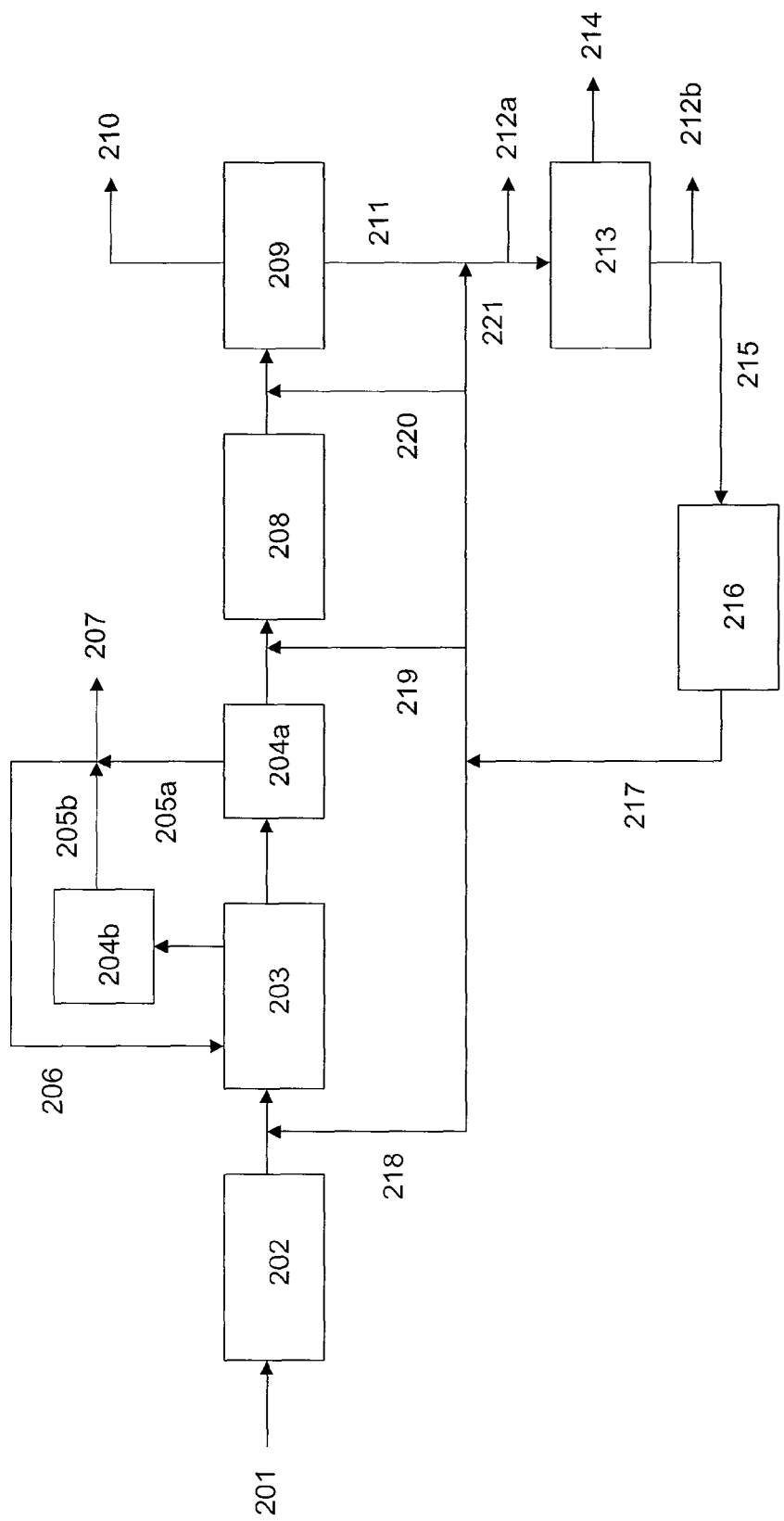
FIG. 2 is a schematic representation of one embodiment of the present invention.

Turning now to FIG. 2, one embodiment of the present invention is presented. Feed gas stream 201 is feed into hydrodesulfurization unit 202. The resulting stream is possibly blended with tail gas recycle stream 218 (described below) and the stream is introduced as the feed stream to reforming unit 203. In one embodiment of the present invention, a pre-reformer (not shown) is upstream of reforming unit 203.

Reforming unit 203 may be a tubular Steam Methane Reformer (SMR) for reforming hydrocarbons, such as natural gas, LPG, refinery gas and naptha. The SMR may operate with a Steam to Carbon (S/C) ratio of between about 1.5 and about 4.5. The S/C ratio may also be between about 2.0 and about 3.0. The syngas temperature as it exits the reformer outlet may be in the range of between about 1300 F and about 1750 F.

The resulting raw syngas stream is possibly blended with tail gas recycle stream 219 (described below), then cooled by indirect heat exchange with boiler feed water in first heat recovery unit 204a, thereby producing first steam stream 205a. The combustion exhaust gas from the furnace of reforming unit 203 enters second heat recovery unit 204b, thereby producing second steam stream 205b. First steam stream 205a and second steam stream 205b are combined, with at least a portion of the resulting steam stream 206 being directed to reforming unit 203 to provide the steam to the reforming process. Any remaining steam exits the system as export steam stream 207.

The proposed invention provides total flexibility in selecting the operating conditions for reformer 203 and CO shift reactor 204. A reduced S/C ratio, and reduced reformer outlet temperature will reduce the amount of waste heat that has to be recovered as steam 205a, 205b. These conditions can be selected to produce just enough steam that is required for the process, and eliminate any export steam, zero steam export (flowrate at 207 is zero).

The use of fuel with less inert components, such as CO2 and the resulting higher heating value, increases the furnace 203 thermal efficiency. The reduced flue gas quantities result in reduced heat loss at the stack. The steam 205b produced by heat recovery from the flue gas is also reduced. and the raw syngas stream is then introduced into CO shift reactor 208. Shift reactor 208 may be on stage or two stage with an intercooler. Shift reactor 208 may use an iron based catalyst or a copper based catalyst. The resulting shifted syntas stream is possibly blended with tail gas recycle stream 220 (described below), optionally cooled, and the stream is then introduced into PSA 209, wherein hydrogen product stream 210, and tail gas stream 211, are produced. Tail gas stream 211 may be at a low pressure of between about 2 psig and about 100 psig. Tail gas stream 211 may be at a pressure of between about 3 psig and about 50 psig. The performance of the PSA improves, which is to say resulting in a higher hydrogen recovery and a physically smaller unit, at a lower tail gas pressure. Tail gas stream 211 is possibly blended with tail gas recycle stream 221 (described below). As the hydrogen recovery increases, the concentration of other components, such as methane, CO, and nitrogen will increase in PSA tail gas stream 211

A portion of tail gas stream 211 may be used a fuel 212. Fuel 212 may be sent to the reformer furnace 203. The tail gas to be sent to the fuel may be taken upstream 212a, or downstream 212b, of CO2 removal unit 213. It may be required to reject part of CO2 from the recycle loop. Should this be required, the remainder of tail gas stream 211 may be introduced to CO2 removal unit 213, wherein CO2 stream 214, and recycle stream 215, are produced. CO2 removal unit 213 may be a solvent wash system (such as amine wash system, Selexol which is a mixture of the dimethyl ethers of polyethylene glycol, or other known solvents), VPSA or by other means known to the skilled artisan. CO2 removal unit 213 may use a solvent that is MDEA based. CO2 stream 214 is available for sequestration.

The amount of CO2 to be removed may be varied. The amount of CO2 to be removed may depend on the amount of regeneration heat available. Typically a part of the heat in the syngas is used for solvent regeneration (not shown). CO2 removal unit 213 may be designed to remove only between about 50% and about 80% of the CO2 that is present in the stream. This can be done by using only low level heat, such as heat below about 250 F and about 300 F, in the syngas. Typically, this level of heat in the syngas is rejected to air or cooling water. As such, there is no useful heat being used for CO2 removal.

Recycle stream 215 is compressed in tail gas compressor 216, thereby producing pressurized recycle stream 217. The power for Recycle compressor 216 may be optimized by varying the PSA tail gas pressure in the ranges mentioned above. The minimum flowrate for recycle stream 217 will depend on the excess tail gas stream that cannot be used as fuel for the SMR furnace 203. The maximum flowrate of recycle stream 217 is determined by the presence of inert components, such as nitrogen, that may require some purge to fuel. CO2 from the recycle stream is partially removed in CO2 removal unit 213.

Pressurized recycle stream 217 may be split into one or more sub-streams, 218, 219, 220, 221 and the recycle stream may be sent to upstream of reformer, or CO shift, PSA, or CO2 removal unit (as discussed above). The skilled artisan would recognize that only a part of the PSA tail gas is recycled as determined by the heat balance around the SMR furnace.

Recycling 219 upstream of CO shift reactor 208 will reduce the amount of CO and CO2 that is recycled to the reformer 203. Recycling 221 upstream of the CO2 removal unit 213 will reject more CO2, reducing the amount of CO2 to be recycled to the reformer or shift reactor.

The recycle also results in overall hydrogen recovery. Incremental recycle has to be justified by the economics of compressing low pressure PSA tail gas to achieve hydrogen recovery. A complete recycle of the tail gas will yield close to 100% hydrogen recovery. Increased hydrogen recovery reduces the size of hydrodesulfurization reactor 202, and reformer 203, thereby providing significant capital cost savings.

The amount of heat rejected from the process gas to air or cooling water is also reduced. Reduced flue gas quantities also reduce heat loss to the stack. This results in improved thermal efficiency of the hydrogen production unit.

A reduced S/C ratio, and the reduced reformer outlet temperature will reduce the amount of fuel required in SMR furnace 203. This will reduce the amount of NOx produced in SMR furnace 203. It will also reduce the amount of CO2 vented in the flue gas.

What is claimed is:

1. A high thermal efficiency process for hydrogen recovery, comprising;

combusting a first fuel stream to a reforming furnace, thereby producing reforming heat and a hot exhaust stream;

exchanging heat indirectly between said hot exhaust stream and a first feed water stream, thereby producing a first steam stream;

providing a hydrocarbon containing stream and a feed steam stream to said reforming furnace, utilizing said reforming heat and producing a hot raw syngas stream;

exchanging heat indirectly between said hot raw syngas stream and second feedwater stream, thereby producing a second steam stream and a cooled, raw syngas stream;

introducing said cooled, raw syngas stream to a CO shift converter, thereby producing a shifted syngas stream;

introducing said shifted syngas stream into a pressure swing adsorption unit, thereby producing a hydrogen product stream and a tail gas stream;

introducing said tail gas stream to a CO2 removal unit, thereby producing a CO2 stream and a recycle stream;

compressing said recycle stream, thereby producing a compressed recycle stream;

combining said compressed recycle stream with at least one stream selected from the group consisting of said hydrocarbon containing stream, said cooled raw syngas stream, said shifted syngas stream, and said tail gas stream; and combining said first steam stream and said second steam stream, thereby producing said feed steam stream.

2. The process of claim 1, further comprising removing a fuel stream from said tail gas stream, upstream of said CO2 removal unit.

3. The process of claim 1, further comprising removing a fuel stream from said tail gas stream, downstream of said CO2 removal unit.

4. The process of claim 1, wherein said hydrocarbon containing stream contains at least one of the group consisting of natural gas, LPG, refinery gas and naptha.

5. The process of claim 1, wherein said hot raw syngas has a temperature of between about 1300 F. and about 1750 F.

6. The process of claim 1, wherein said reforming furnace has a steam to carbon ratio, wherein said steam to carbon ratio is between about 1.5 and about 4.5.

7. The process of claim 6, wherein said steam to carbon ratio is between about 2.0 and about 3.0.

8. The process of claim 1, wherein said shift converter utilizes a catalyst, wherein said catalyst is iron based.

9. The process of claim 1, wherein said shift converter utilizes a catalyst, wherein said catalyst is copper based.

10. The process of claim 1, wherein said tail gas has a pressure, wherein said pressure is between about 2 psig and about 100 psig.

11. The process of claim 10, wherein said tail gas has a pressure of between about 3 psig and about 50 psig.

12. The process of claim 1, wherein said CO2 removal unit utilizes a solvent was system, wherein said solvent is selected from the group consisting of amines, a mixture of the dimethyl ethers of polyethylene glycol, and MDEA.

13. The process of claim 1, wherein said CO2 removal unit is a pressure swing adsorption unit, as a part of the H2 PSA unit, or as a separate PSA unit.

* * * * *